United States Patent [19]
Sargent

[11] Patent Number: 5,951,036
[45] Date of Patent: Sep. 14, 1999

[54] ADJUSTABLE COUPLER FOR A WEIGHT DISTRIBUTING TRAILER HITCH APPARATUS

[76] Inventor: Frank T. Sargent, 5433 Brandy Cir., Fort Myers, Fla. 33919

[21] Appl. No.: 09/109,741

[22] Filed: Jul. 2, 1998

Related U.S. Application Data

[60] Provisional application No. 60/051,516, Jul. 2, 1997.
[51] Int. Cl.⁶ .................................................. B60D 13/00
[52] U.S. Cl. ............................................ 280/477; 280/508
[58] Field of Search .......................... 280/405.1, 406.1, 280/406.2, 407, 407.1, 477, 491.5, 490.1, 489, 515, 508

[56] References Cited

U.S. PATENT DOCUMENTS

| | | | |
|---|---|---|---|
| 911,456 | 2/1909 | Stenger | 280/508 |
| 3,679,231 | 7/1972 | Derr, Jr. | 280/489 |
| 3,788,259 | 1/1974 | Colin | 280/508 |
| 3,891,237 | 6/1975 | Allen | 280/508 |
| 4,131,295 | 12/1978 | Highberger | 280/477 |
| 4,253,680 | 3/1981 | Albright et al. | 280/406.1 |
| 4,913,451 | 4/1990 | Woodall | 280/491.5 |
| 5,011,178 | 4/1991 | Sanderson | 280/489 |

*Primary Examiner*—Paul N. Dickson
*Assistant Examiner*—Lynda Jasmin
*Attorney, Agent, or Firm*—William E. Noonan

[57] ABSTRACT

An adjustable coupler apparatus for a trailer hitch includes a drawbar assembly and a hitch head assembly. The drawbar assembly is interconnected to a tow vehicle and includes an elongate bar and a drawbar angle adjuster that is pivotally interconnected and angularly adjustable relative to the bar. The hitch head assembly includes a ball component and a channel that is pivotally interconnected to the ball component. A horn is slidably received by the channel. The horn and the drawbar angle adjuster are selectively coupled to interconnect the trailer to the tow vehicle.

17 Claims, 13 Drawing Sheets

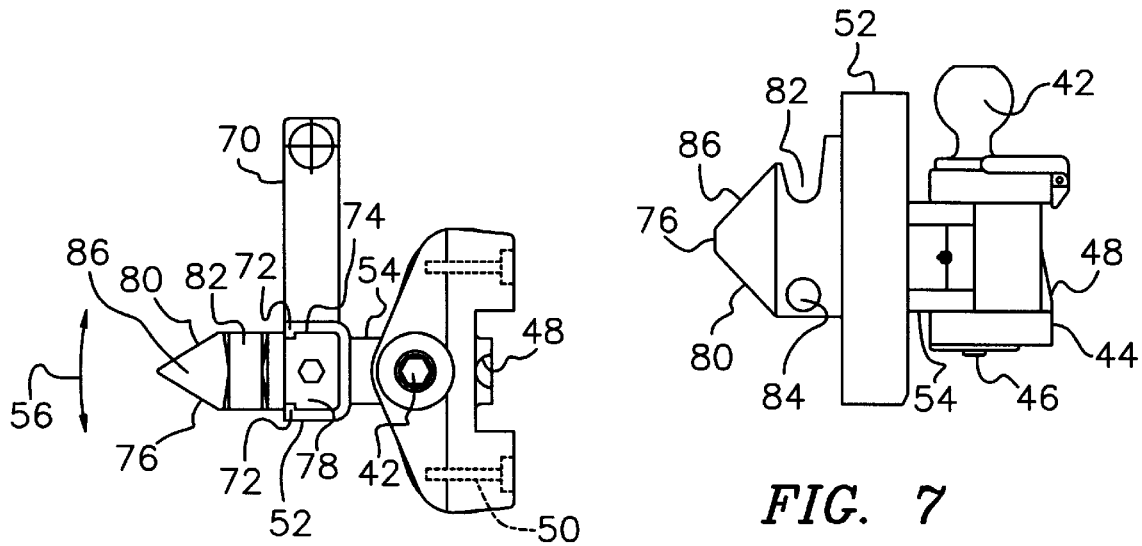
FIG. 8
FIG. 7
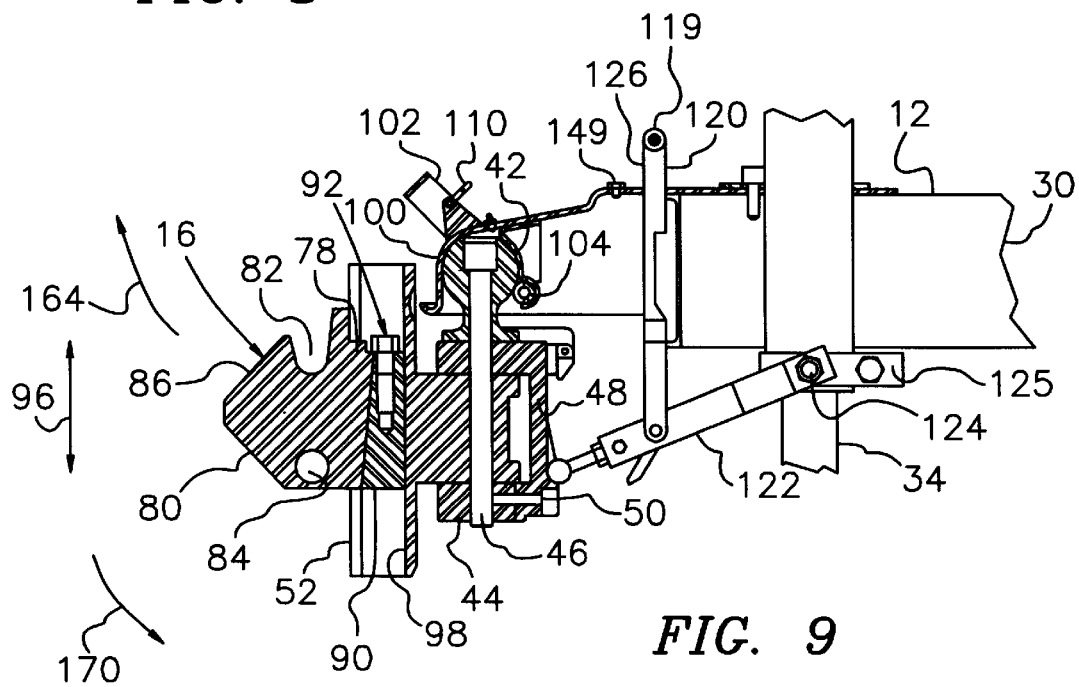
FIG. 9

ADJUSTABLE COUPLER FOR A WEIGHT DISTRIBUTING TRAILER HITCH APPARATUS

RELATED APPLICATION

This application is a continuation of U.S. patent application Ser. No. 60/051,516, filed Jul. 2, 1997.

FIELD OF THE INVENTION

This invention relates to an adjustable coupling mechanism for a weight distributing trailer hitch apparatus.

BACKGROUND OF THE INVENTION

Various hitch assemblies are available for connecting a trailer to a tow vehicle. When heavy trailers and large tongue weights are involved, levelizing or weight distributing hitches are normally utilized. These assemblies spread the tongue weight of the trailer among the axles of the tow vehicle and the trailer so that a stable ride is achieve. Installing such hitches and coupling the trailer to the tow vehicle is almost invariably a complicated, laborious and time consuming procedure. The installation procedure requires a fairly high degree of precision to ensure that proper weight distribution and a stable ride are achieved. Ideally, the levelness of the tow vehicle's body, as measured at the front and rear of the vehicle should vary in height before and after coupling by no more than ½". Otherwise, one of the axles may be overloaded, which can result in poor handling and present an increased risk of accident.

Conventionally, when a weight distributing trailer hitch is purchased, it must be installed by a hitch specialist. After examining the tow vehicle and trailer involved, the installer assembles the hitch so that, based upon his experience, proper weight distribution is provided. Specifically, the installer welds the drawbar extension (which is an extension of the conventional drawbar receiver) onto the hitch head at a desired angle. Unfortunately, this technique is far from precise. If an incorrect angle is formed, the weld may have to be broken and reformed. In some cases, the incorrect angle is simply ignored. Such a hitch may contribute to potentially dangerous instability of the trailer and tow vehicle. Even in cases where the proper weight distributing angle is formed, problems may occur. Typically, the correct angle applies for only one particular type of tow vehicle. If a different vehicle is to be used, the weld again may have to be broken and reformed. This can be a tedious and fairly costly procedure that almost always requires the expertise of a professional installer.

After the initial trailer hitch installation is performed, the trailer owner encounters difficulties each time the trailer must be coupled to or uncoupled from the tow vehicle. The welded hitch head and drawbar extension, must be removed from storage and carried to the trailer. This is normally a fairly heavy, cumbersome and dirty unit. It must be lifted and manipulated by the owner and interconnected between the tow vehicle and the trailer. The hitch head includes the ball, which must be greased by hand and attached to the ball coupler. The spring bars must also be removed from storage and greased by hand and hooked to the trailer. This procedure is typically time consuming, messy, arduous and hard work. Furthermore, the tow vehicle must be moved with precision to properly position the trailer ball under the ball receiver. A second person is usually required to check the accuracy of the tow vehicle movement, provide signals to the driver for accurate positioning of the hitch ball beneath the hitch ball coupler, and otherwise provide assistance.

SUMMARY OF INVENTION

It is therefore an object of the present invention to provide an adjustable coupling mechanism for a weight distributing trailer hitch, which enables a trailer to be quickly and conveniently coupled to a tow vehicle, and which properly distributes the tongue weight of the trailer to the axles of the trailer and the tow vehicle.

It is a further object of this invention to provide a trailer hitch coupling mechanism wherein the tongue and hitch head are adjustably interconnected and not welded together so that hitch adjustments are facilitated.

It is a further object of this invention to provide a trailer hitch coupling mechanism that may be adapted for use with many types of tow vehicles and trailers; and which can be quickly and conveniently adjusted by mechanical means to provide safe and reliable weight distribution for such tow vehicles and trailers.

It is a further object of this invention to provide a trailer hitch coupling that is suited for use in any type of trailer hitch.

It is a further object of this invention to provide a coupling mechanism assembly that permits weight leveling trailer hitch adjustments to be performed more accurately, quickly, inexpensively and conveniently than has heretofore been possible, and which does not require a hitch specialist.

It is a further object of this invention to provide a trailer hitch coupling mechanism assembly that eliminates the need to break and reform hitch welds after the initial weight distributing adjustments have been made and which permits many trailer owners to perform their own hitch installations.

It is a further object of this invention to provide a trailer hitch coupling mechanism assembly that significantly facilitates routine coupling and uncoupling of the tow vehicle and trailer.

It is a further object of this invention to provide a trailer hitch coupling that requires less handling of heavy and cumbersome hitch components than known trailer hitches and which may be readily installed and removed by the trailer owner.

It is a further object of this invention to provide a trailer hitch coupling that provides for an improved, stable and levelized ride for the trailer and tow vehicle.

This invention features an adjustable coupling for trailer hitches including an angularly adjustable drawbar assembly and a hitch head assembly having a height adjustable component that is selectively coupled to the drawbar assembly. The drawbar assembly includes an elongate drawbar that is selectively interengaged with a complementary receiver mounted on the tow vehicle. The drawbar assembly also includes an angularly adjustable first coupling component that is pivotally interconnected to the distal end of the elongate bar. The first coupling component includes means for adjusting the angle between the bar component and the first coupling component. The hitch head assembly includes a ball element that is releasably attachable to and is suspendable from a ball coupler mechanism carried by the trailer. A height adjustment channel is pivotally connected to the ball component. A second, height adjustable coupling component is slidably interengaged with the channel and selectively raised and lowered therein. The second coupling component includes means for interengaging complementary means in the first coupling component to couple the first and second coupling components. Means are provided for adjusting the height of the second coupling component. Means are also provided for temporarily supporting the second coupling component at a predetermined angular alignment. The angle of the first coupling component relative to the elongate bar is adjusted according to predetermined parameters for the particular tongue weight and tow vehicle type involved. Likewise, the height or position of the second coupling component in the channel is adjusted according to predetermined parameters. Finally, the angular orientation of the second coupling component is adjusted and the first and second coupling components are interengaged and coupled. A pair of conventional spring bars carried by the hitch head assembly are loaded and, as a result, the hitch head and drawbar assemblies are angularly adjusted to properly distribute the tongue weight to the axles of the tow vehicle and trailer.

In a preferred embodiment, the second coupling component includes a horn having means defining an upper recess and means defining a lower hitch pin hole. The first coupling component may include a fixed upper pin that engages the recess and means defining a hitch pin hole that is aligned with the hitch pin hole in the second coupling component. When the fixed pin is interengaged with the recess and the hitch pin holes of the first and second coupling components are aligned, those holes receive an elongate hitch pin such that the first and second coupling components are coupled. The horn may include a ramp that is interengaged by the fixed pin of the first coupling component. As the drawbar assembly is driven rearwardly, the fixed pin of the first coupling component interengages and rides up the ramp and into the recess means of the second coupling component.

The hitch head assembly includes means for pivotally supporting a pair of spring bar elements. The spring bar elements may include respective trunion portions that are pivotally interengaged with the hitch head assembly. A pair of standard loading bar brackets may be interconnected to the frame of the trailer. A respective chain interconnects each bracket to a distal end of a respective one of the spring bars.

The ball coupler may include a ball receiver and cam means that are alternatable between a first position wherein the ball is permitted to be introduced into and removed from the ball receiver and a second position wherein the ball is locked in and suspended from the ball receiver. The cam means may be operated by a lever apparatus.

Means may be provided for locking the second coupling component in a selected position along the channel. Such means may include a tapered component that is mateably interengagable with a corresponding taper carried by the second coupling component. The tapered component is received by the channel and interengaged with the mating taper of the second coupling component to urge the second coupling component into locking interengagement with the channel. A bolt or other means are provided for interconnecting the tapered component and the second coupling component.

The elongate bar may be received in a standard receiving tube mounted to the car and may be secured thereto by a pin. The means for adjusting the angle between the bar and the first coupling component may include a threaded component carried by the first coupling component and interengaged with a nut carried by the bar. Typically, the first coupling component includes a tongue angle adjuster that is angularly adjusted such that the lower hitch pin hole is angularly displaced relative to the fixed pin. The amount of displacement compensates for the eventual torsion exerted on the drawbar assembly such that when the final adjustments are made, a line extending from the axis of the fixed pin to the axis of the hitch pin hole is substantially perpendicular to the level ground.

The angular orientation of the hitch head and the second coupling component is set by means of a hitch head angle adjuster that is carried by the trailer ball coupler. The hitch head angle adjuster may include an elongate bearing assembly that is pivotally mounted to the jack assembly. The bearing assembly may include a spherical bearing element that is adjustably carried by an elongate pivoting bracket. The bearing assembly is selectively engaged with the hitch head assembly to hold the hitch head assembly at a desired angular orientation. Means may be provided for selectively interengaging the bearing assembly with the hitch head assembly and disengaging the bearing assembly from the hitch head assembly. Such means may include a torsionally resilient spring arm that is pivotally interconnected to the elongate arm of the bearing assembly and extends upwardly therefrom. A handle located at the upper end of the torsionally resilient arm is grasped to pivotally raise and lower the bearing assembly. Means may be provided for temporarily retaining the bearing assembly in a condition that supports the hitch head assembly at a predetermined angular orientation. Specifically, the bearing element may be pivotally interconnected to the support arm and a stop element may be attached to the support arm to hold the bearing element in a locked condition against the hitch head assembly. When the torsionally resilient arm is raised, the bearing element is allowed to pivot downwardly to disengage the bearing assembly from the hitch head assembly. As a result, the hitch head assembly is permitted to pivot downwardly under the weight of the coupled tongue assembly and tow vehicle. Latch means are provided for holding the torsionally resilient bar in the raised position.

BRIEF DESCRIPTION OF THE DRAWINGS

Other objects, features and advantages will occur from the following description of preferred embodiments and the accompanying drawings, in which:

FIG. 7 is an elevational side view of the hitch head assembly;

FIG. 8 is a top plan view of the hitch head assembly;

FIG. 9 is an elevational, partly cross sectional view illustrating how the hitch head assembly is interconnected to the A-frame of the trailer;

DETAILED DESCRIPTION OF PREFERRED EMBODIMENTS

Figure 1:
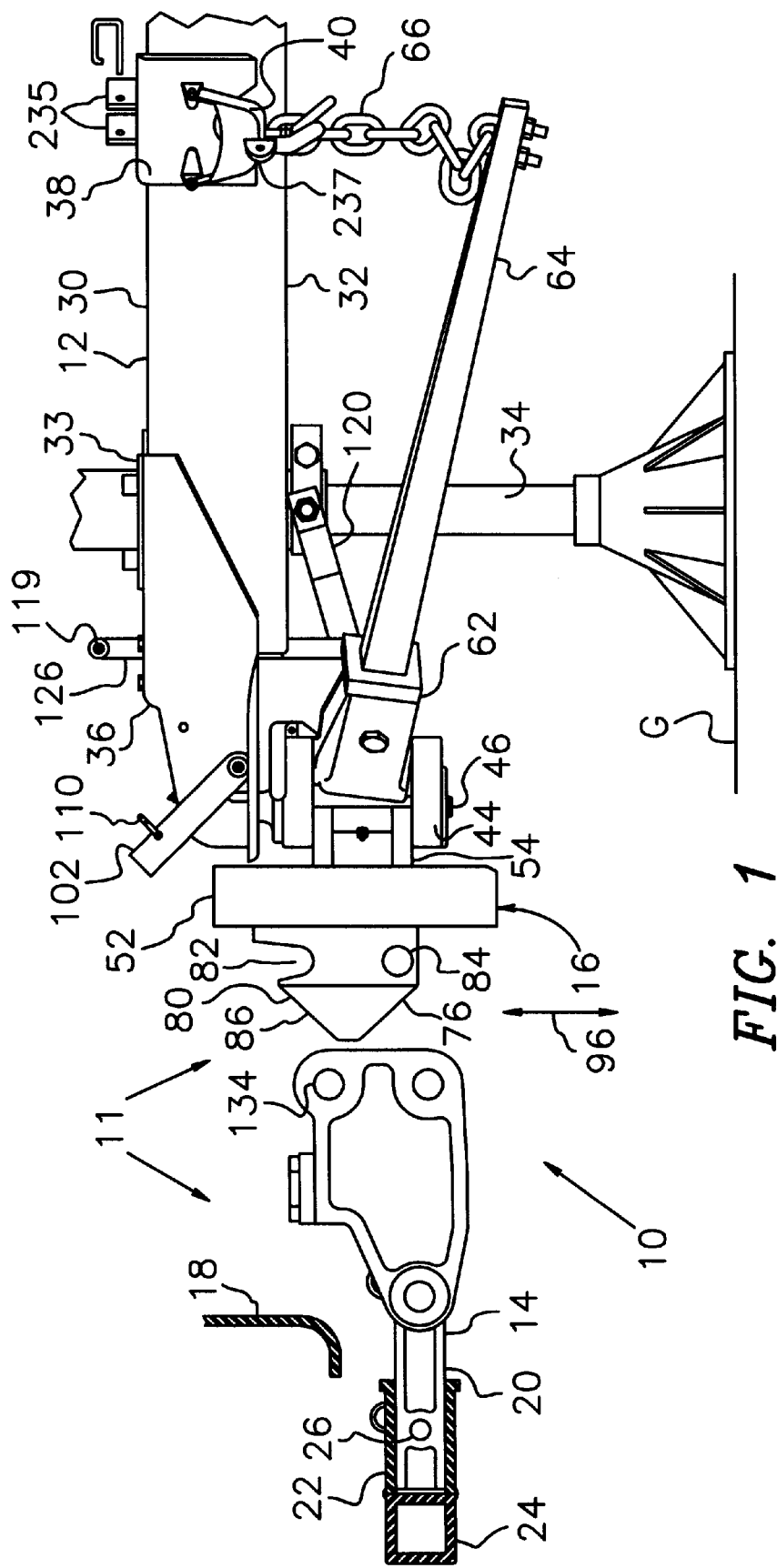
FIG. 1 is a elevational side view of a trailer hitch utilizing the adjustable trailer hitch coupler of this invention with the hitch head assembly suspended from the front end of a trailer and the drawbar tongue assembly interconnected to a tow vehicle; the hitch head assembly and drawbar assembly are depicted prior to coupling in accordance with this invention.

There is shown in FIG. 1 a trailer hitch 10 that is designed for attaching an A-frame trailer 12 to a tow vehicle, not specifically shown. Hitch 10 is suited for use in connection with various types of trailers. The hitch and, more particularly, the adjustable coupler 11 of this invention are likewise designed to be used with all types and sizes of tow vehicles. Neither the type of tow vehicle nor the type of trailer should be construed as a limitation of this invention. It should also be understood that the axles and wheels of both the trailer and the tow vehicle are not depicted. These are standard components that do not comprise a part of the invention. Their relative positioning and operation should be understood to those skilled in the art. As with all weight distributing trailer hitches, the adjustable hitch of this invention is intended to properly distribute the tongue weight of the trailer to the front and rear axles of the tow vehicle and trailer, respectively, such that a stable, levelized ride is achieved.

Hitch apparatus 10 includes a drawbar assembly 14 and a hitch head assembly 16. The hitch head assembly is attached to and suspended from trailer 12 in a manner that will be described more fully below. The drawbar assembly is disposed beneath the vehicle bumper 18 and includes an elongate bar 20, which preferably has a square cross sectional shape. Bar 20 is selectively inserted in a complementarily shaped receiver tube 22. The receiver tube is secured to and extends from a transverse mounting bar 24. This bar extends between and is attached to the longitudinal frame components of the tow vehicle. This form of attachment is conventional. Indeed, the transverse bar 24 and receiver tube 22 are widely employed for various types of known trailer hitches. Elongate bar 20 is secured to tube 22 by a transverse pin 26.

Figure 2:
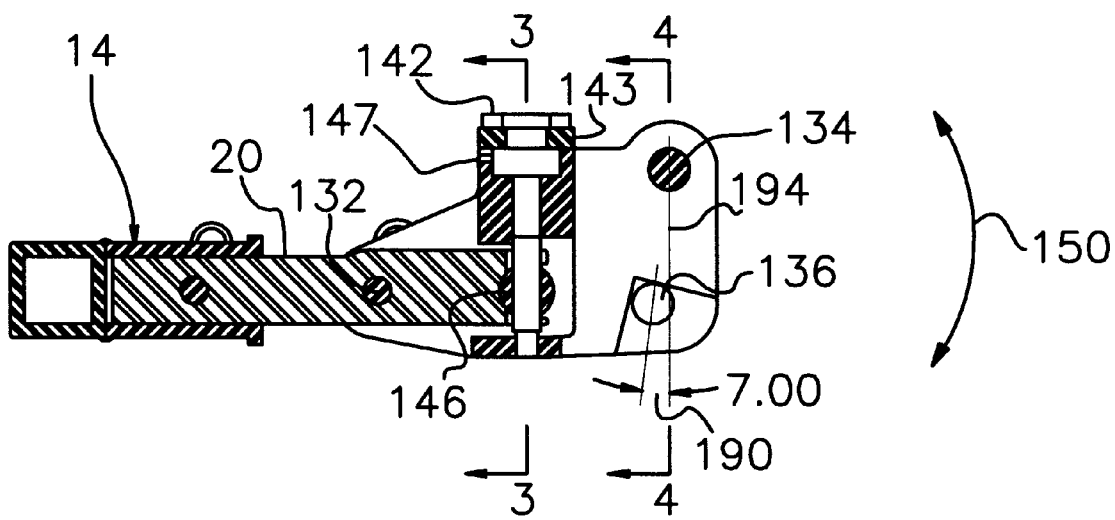
FIG. 2 is an elevational, cross sectional view of the drawbar assembly.
Figure 4:
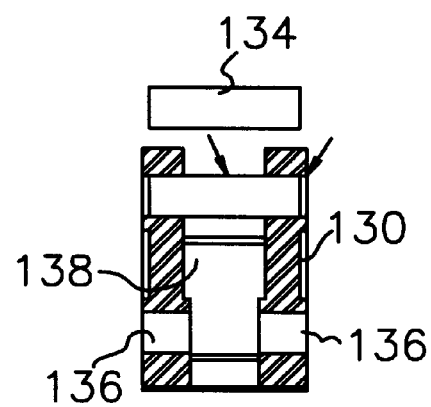
FIG. 4 is an elevational, cross sectional view taken along line 4—4 of FIG. 2.
Figure 3:
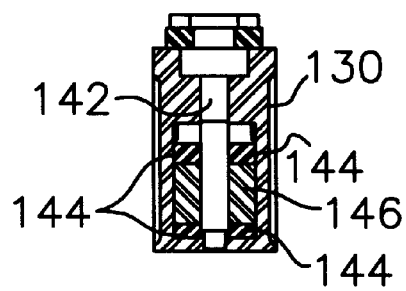
FIG. 3 is a cross sectional view taken along line 3—3 of FIG. 2.
Figure 5:
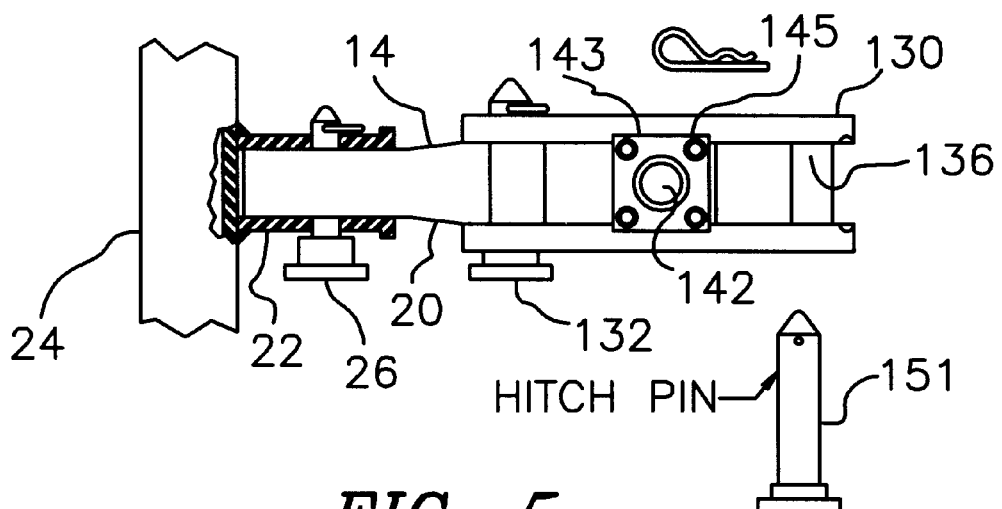
FIG. 5 is a top, partly cross sectional view of the drawbar assembly.

As illustrated in FIGS. 2–5, drawbar assembly 14 includes a first, angularly adjustable coupling component 130 that is pivotally interconnected by a pin 132 to bar 20. Component 130 has a fixed upper pin 134 and a pair of aligned lower hitch pin holes 136. The angularly adjustable component also includes a central, longitudinal opening 138, FIG. 4. The rearward end of opening 138 receives elongate bar 20. An angle adjustment mechanism 140 includes a hex headed adjustment screw 142, which extends transversely through component 130. Screw 142 extends through a mounting plate 143 into the coupling component. The plate itself is held in place by a plurality of retaining bolts 145, FIG. 5. The inner, forward end of bar 20 includes four fingers 144 (two of which are shown in FIG. 2), which retain an adjustment nut 146. This nut threadably engages adjustment screw 142. The upper and lower ends of screw 142 are rotatably interengaged with coupling component 130. As a result, screw 142 is operated to adjust the angle between bar 20 and coupling component 130 in the manner indicated by double-headed arrow 150, FIG. 2. At a benchmark angle of "0°" a line connecting the axes of pin 134 and hitch pin holes 136 is perpendicular to the longitudinal axis of bar 20. In order for the drawbar assembly 14 to exhibit proper weight distribution, this angle must be increased by an angle of from less than 1° to as much as 10°. Typically, the screw 142 is rotated such that the forward end of component 130 is lowered and holes 136 are adjusted rearwardly of pin 134. This operation and its importance are described more fully below. A set screw 147 is tightened to hold component 130 at its selected angle. A hitch pin 151 is interengaged with hole 136 when coupling is performed in a manner that likewise will be described more fully below.

Figure 6:
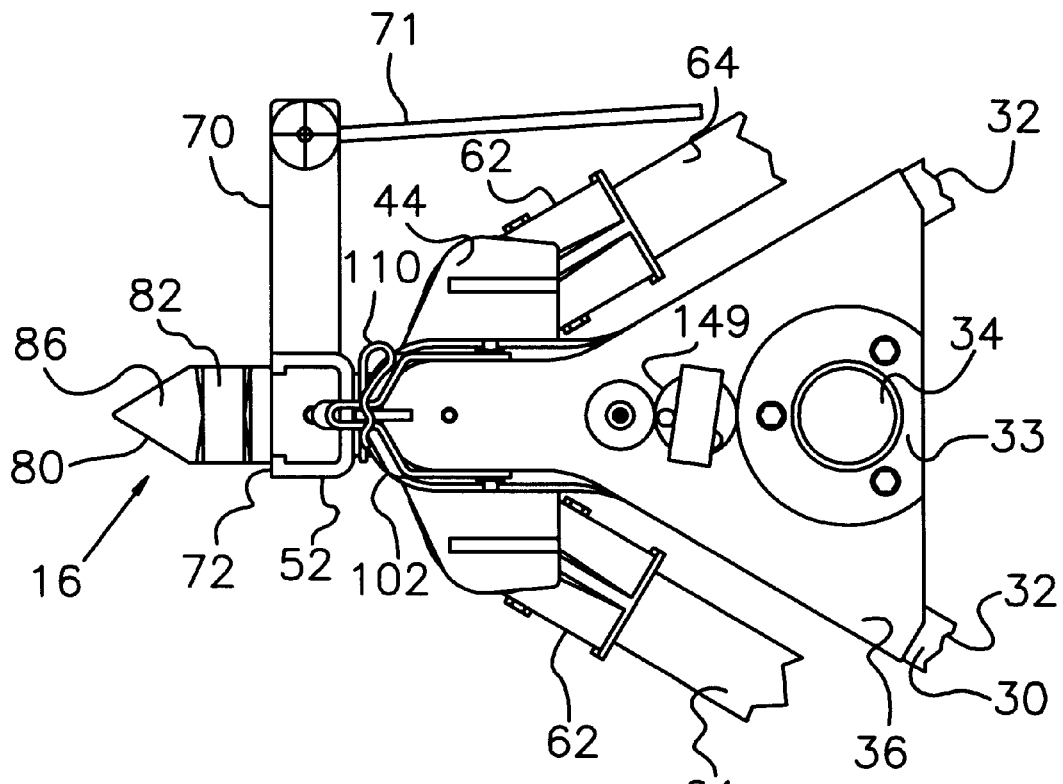
FIG. 6 is a top plan view of the front end of the trailer's A-frame and the attached hitch head assembly.

As shown in FIGS. 1 and 6, the front end of trailer 12 has a generally A-shaped frame 30 comprising a pair of elongate frame elements 32 that converge at the forward end of the trailer. A standard trailer jack 34 extends upwardly from ground G. through a coupling plate 33 carried by ball coupler 36 at the forward end of trailer frame 30. A standard spring bar loading bracket 38 is carried by each of the elongate frame components 32. Each such bracket 38 carries a conventional chain toggle 40. The operation of these toggles in connection with the present invention is described below. However, it should be understood that the toggles are used to properly load the trailer hitch in a manner that should be understood to those skilled in the art. The particular loading mechanism that is utilized is not a part or limitation of this invention.

Figure 10:
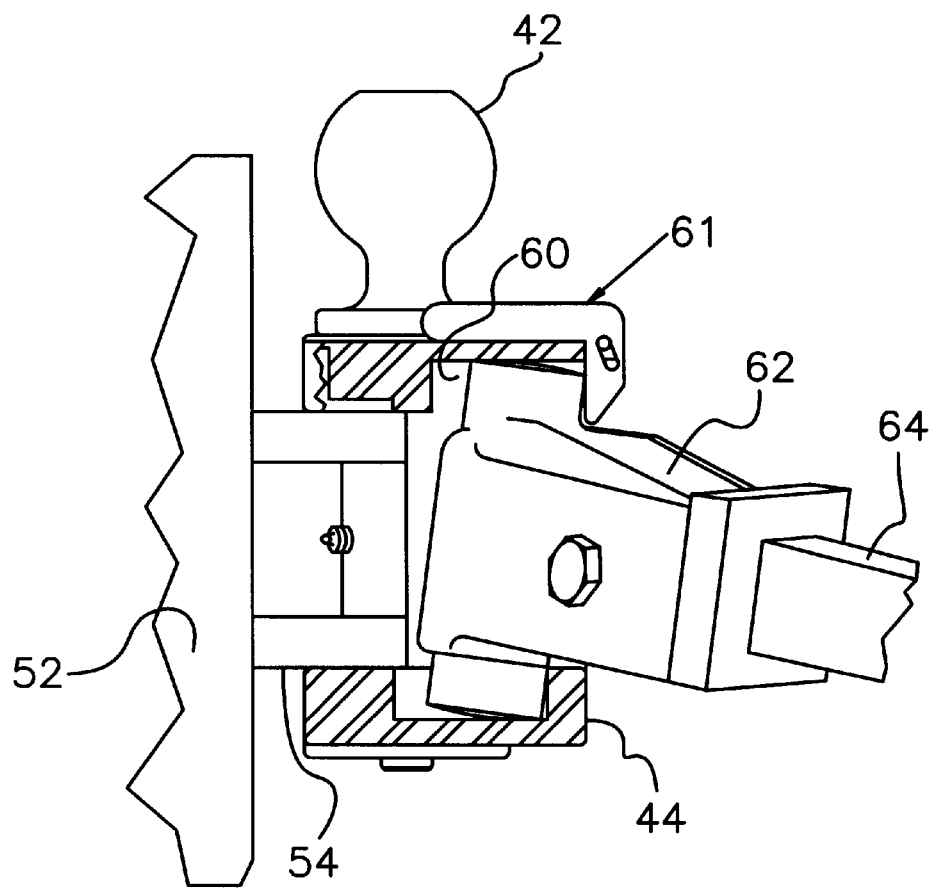
FIG. 10 is an elevational, cross sectional view of the ball component and one of the trunion-type interconnections that pivotally mounts a respective spring bar to the ball component.

Hitch head assembly 16, also shown in FIGS. 7–10, includes a ball element 42 that is secured to a yoke 44 by an elongate connecting pin 46, best shown in FIG. 9. A bearing pocket 48 is secured to yoke 44 by appropriate screws 50. An elongate, generally vertical channel 52 is joined by integral portion 54 to pin 46. Sufficient tolerances are used such that the channel 52 is pivotable relative to yoke 44 and ball element 42 in the manner indicated by double-headed arrow 56 in FIG. 8. As best shown in FIG. 10, yoke 44 includes a receptacle 60 for receiving a respective trunion 62. A backup finger 61 is attached to yoke 44. It should be understood that this particular construction is employed on Reese™ type trailer hitches and does not comprise a part of this invention. The trunion carries a spring bar 64. As shown in FIG. 1, the spring bar extends rearwardly from hitch head assembly 14. The distal end of spring bar 64 is interconnected by a chain 66 to a respective toggle 40. As shown in FIG. 6, a pair of spring bars 64 are mounted to hitch head 16 in this manner. Specifically, spring bars 64 extend pivotally from respective recesses in yoke 44. Each of the spring bars is connected by a respective trunion component 62 in the manner illustrated in FIG. 10. The opposite end of each spring bar 64 is suspended by respective chain 66, FIG. 1. In the "unloaded" condition illustrated in FIGS. 1 and 10, the spring bars hang such that the trunion pins are positioned in recesses 60 in the manner illustrated in FIG. 10. In this condition, the upper trunion pin bears against backup finger 61. As will be known to those skilled in the art, finger 61 may be pivoted to release the trunion and the spring arm from the hitch head.

A mounting bracket 70 extends integrally from one side of channel 52. Bracket 70 is employed to carry a friction sway control device 71, which is shown in connection with FIG. 6. A distal end of device 71 is secured to trailer frame 12 in a conventional manner.

Channel 52 includes a pair of inwardly turned segments 72, FIGS. 6 and 8, and a central, longitudinal slot 74. A second coupling component 76 is slidably interengaged with channel 52. Component 76 comprises an insertion portion 78 that is received within and has a shape generally conforming to the shape of longitudinal channel slot 74. The coupling component further includes a horn portion 80 that is unitarily interconnected to insertion portion 78. As best shown in FIGS. 1, 7 and 9, horn portion 80 includes an upper recess 82 and a lower hitch pin hole 84. An incline or ramp 86 extends from the forward end of horn 80 to a point proximate recess 82. In FIG. 9, horn 80 is shown interconnected with a tapered element 90 by means of a connecting bolt 92. When horn 80 and tapered element 90 are not interconnected in this manner, the horn is free to slide vertically within channel 52 as indicated by double-headed arrow 96, FIGS. 1 and 9. Tapered element 90 includes an inclined surface that matingly engages a complementary inclined surface on horn 80. The tapered element has a thickness at its lower end that is slightly larger than the distance between the lower end of the complementary taper on horn 80 and the inside wall 98 of channel 52. As a result, when tapered element 90 is inserted into the channel and matingly interengaged with horn 80, the horn is urged or squeezed into locking, frictional interengagement with inturned portions 72 of channel 52. In this manner, horn 80 may be positioned and locked at any desired location along channel 52 by interengaging bolt 92 with the horn and element 90 at that location. The importance of this adjustment is described more fully below.

Figure 11:
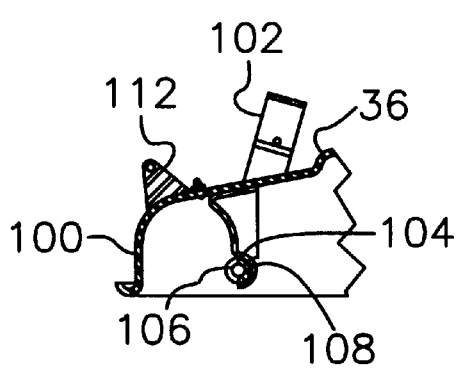
FIG. 11 is an elevational, cross sectional view of the ball coupler.
Figure 11A:
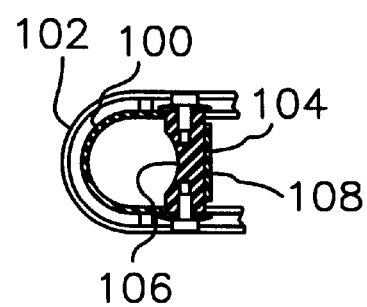
FIG. 11A is a top cross sectional view of the ball coupler.

The forward end of ball coupler hood 36 includes a ball coupling receiver 100, shown alone in FIGS. 11 and 11A. A generally U-shaped lever 102, FIGS. 1, 6, 9, 11 and 11A, is pivotally interconnected to a cam element 104 located proximate the opening of coupling receiver 100. As best shown in FIGS. 11 and 11A, cam 104 includes a recess 106 and a rounded locking portion 108. When lever 102 is pivoted rearwardly (FIGS. 11 and 11A) the hitch ball 42 may be introduced into and removed from coupling receiver 100. To lock the ball, and thereby hitch head 16, onto the trailer, the ball is introduced into the coupling receiver. The lever 102 is then pushed forwardly into the position shown in FIGS. 6 and 9. A latching pin 110 is connected through corresponding holes in lever 102 and in ear 112 of ball coupler 36. This holds the lever closed or latched. In this position, the rounded portion 108 of cam element 104 is interengaged beneath ball 32. The ball cannot be removed from the coupling receiver 100. It is latched firmly in place. As a result, the entire hitch head assembly 16 is attached to and suspended from the hitch head coupling receiver 100.

As shown in FIG. 9, a hitch head angle adjuster 120 is mounted to ball coupler 36 and jack 34. In particular, adjuster 120 includes a bracket assembly 122 pivotally interconnected to the jack by a pivot 124 and a clamp 125, Assembly 122 bears against bearing pocket 48 of hitch head 16. The bracket assembly is selectively raised and lowered by a torsionally resilient spring actuator arm 126 that is slidably interengaged with trailer frame 30. A handle 119 is formed at the upper end of arm 126.

Figure 12:
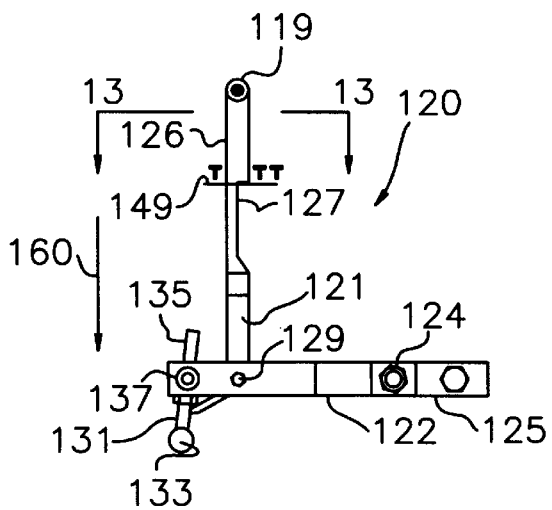
FIG. 12 is an elevational side view of the hitch head angle adjuster apparatus.
Figure 13:
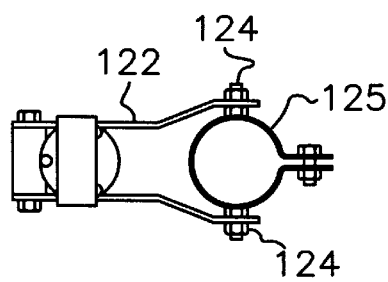
FIG. 13 is a top plan view of the hitch head angle adjuster apparatus.
Figure 14:
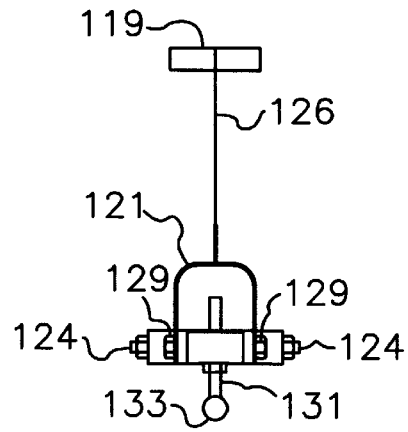
FIG. 14 is an elevational end view of the hitch head angle adjuster apparatus

Hitch head angle adjuster 120 is shown alone in FIGS. 12–14. Actuator arm 126 comprises a thin blade of spring steel having a notch or key slot 127 formed therein. The lower end of arm 126 is interconnected by a U-shaped hanger 121 and a pivot 129 to a pivoting bracket 122. As best shown in FIG. 13, pivoting bracket 122 comprises a pair of diverging elements are secured by a pair of pivot pins 124 to clamp 125. This clamp encircles the jack and fastens the angle adjuster to jack 34 in the manner best shown in FIGS. 1 and 9.

An adjustable bearing assembly 131 is pivotably carried at the distal end of bracket 122. Bearing assembly 131 includes a spherical cam or bearing element 133 carried at the end of a pivot or lever arm 135. The pivot arm is pivotally interconnected to the distal ends of bracket 122 by a mandrel 137 that is interconnected between the elongate elements of bracket 122. Mandrel 137 permits bearing 133 and attached lever arm 135 to pivot up and down in the manner indicated by double-headed arrow 445. Arm 135 includes threads proximate bearing 133 and an adjustment nut 139 threadably engages arm 135. This permits bearing element 133 to be adjusted forwardly and rearwardly in the manner indicated by double-headed arrow 141 in FIG. 15. A stop 443 is welded between the elongate elements of bracket 122 proximate the pivot point of hanger 121. Stop 443 limits the degree to which lever arm 135 and bearing element 133 can pivot upwardly.

Figure 16:
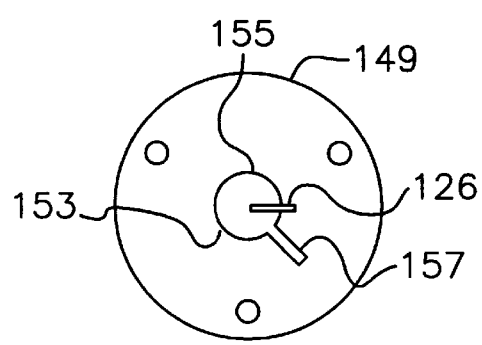
FIG. 16 is a plan view of the latching assembly for holding the hitch head angle adjuster in a raised, disengaged condition.

Spring arm 126 is inserted through a slotted plate 149 (FIGS. 6, 9, 12 and 16) in coupler 36. As best shown in FIG. 16, slotted plate 149 includes a keyway 153 having a central portion 155 and a radial portion 157. Arm 126 is normally biased such that, when the arm is raised, it is offset by approximately 10° from slotted portion 157. The notch 127 is received by central portion 153 and permits arm 126 to torsionally rotate relative to the mounting plate.

Angle adjustment mechanism 120 is selectively operated to engage the hitch head in the following manner. Handle 119 is grasped and arm 126 is rotated until it is aligned with slotted portion 157 of keyway 153. The arm 126 is then lowered as indicated by arrow 160 in FIG. 12. Bracket 122 rotates about pivots 124. Spherical element 133 of bearing mechanism 131 is interengaged with pocket 48 of hitch head 14 in the manner shown in FIG. 9. The bracket 122 pivots downwardly and bearing mechanism 131 is pivoted upwardly until lever arm 135 engages stop 443. At this point, the lever arm has pivoted slightly past the longitudinal axis of bracket 122 such that bearing mechanism 131 is locked in place in pocket 48 of hitch head 14. This causes the hitch head to be pivoted about ball 42 and ball receiver 100 in the manner indicated by arrow 164 in FIG. 9. The importance of this adjustment is described more fully below. In the lowered position, the spring arm 126 is prevented from unwinding and returning to its normal condition because it is latched within keyed slot 157.

To release bearing mechanism 131 from hitch head 16, the user simply grasps handle 19 and pulls arm 126 upwardly. This causes bracket 122 to rotate about pivots 124 on clamp 125. Bearing element 133 rotates against pocket 48 and lever arm 135 pivots about mandrel 137. Eventually, bearing mechanism 131 disengages the hitch head and pivots into the condition shown in FIG. 12. As a result, hitch head 16 pivots in the direction indicated by arrow 170 in FIG. 9 and returns to an unbiased or unpropped position.

Hitch apparatus 10 is installed to securely couple trailer 12 to the tow vehicle and to properly distribute the tongue weight to the axles of the tow vehicle and the trailer. Such installation is performed in the manner illustrated in FIGS. 17–24.

Initially, drawbar assembly 14 is interconnected to the tow vehicle receiver tube 22 and hitch head assembly 16 is suspended from trailer frame 30 in the manner previously described. The installation should be performed on a level ground surface G. The installer should check the height of receiver tube 22 and the inside of ball receiver 100. Preferably, the receiver tube should be between 10.75" and 15.75" in height, depending upon the type of tow vehicle involved. The height of the trailer ball receiver 100 may vary from trailer to trailer, but and should be approximately 19–20". To ensure that the trailer is level, a conventional carpenter's level may be employed. Alternatively, the height of the front and rear of the trailer may be measured. The front end of the trailer is supported in this level condition by jack 34, which may be used to adjust the height within the range specified above. The tow vehicle is backed up so that drawbar assembly 14 is positioned proximate to hitch head assembly 16 (See FIG. 1). The installer next reviews a prepared chart to determine the proper angular adjustment for drawbar assembly 14 and the correct height adjustment for hitch head assembly 16. The following chart recites preferred drawbar angle settings corresponding to particular types of tow vehicles and specific tongue weights.

CHART #1

| Trailer Tongue Weight in Pounds | STIFF (¾-1 TON) | AVERAGE ½ TON | FLEXIBLE (PASSENGER) |
|---|---|---|---|
| LIGHT 450–750 | 2–4 degrees | 4–6 | 4–6.5 |
| MEDIUM 750–1100 | 3–5 | 5–7 | 6.5–8.5 |
| HEAVY 1100–1600 | 4–6 | 6–8 | |
| MAX. TONGUE WGHT. | 2000# | 1500# | 1000# |

Specifically, angle adjuster component 130 is angularly set by adjusting bolt 142, in the manner previously described, to form a predetermined angle 190, FIG. 2. This angle is the amount which component 130 is lowered relative to the longitudinal axis of bar 20. The angle is formed by the line 192 extending through the axes of pin 134 and hitch pin hole 136 and the vertical line 194 that extends through those axes before the adjustment is made. As indicated in Chart #1, only a slight adjustment (e.g. 2°–4°) is required when the trailer tongue weight is very light and a stiff tow vehicle, such as a three quarter to one ton truck is employed. Conversely, when a heavy tongue weight is involved or a light passenger vehicle is employed as a tow vehicle, a much larger angle, e.g. 8.5° or more, may be required.

Angle adjuster 120 is engaged with hitch head 16 so that the axial centers of recess 82 and hole 84 of horn 80 are connected by a line that is perpendicular to the ground. Bearing 133 is adjusted, as previously described, such that when it engages pocket 48 the hitch head hangs perpendicularly from the ball coupler 36. See FIG. 1.

The height of horn 80 may now be adjusted. In particular, horn 80 is positioned longitudinally within channel 52 in the manner previously described. This position is determined by referring to the following chart.

CHART #2

| Trailer Tongue Weight in Pounds | STIFF (¾-1 TON) | AVERAGE ½ TON | FLEXIBLE (PASSENGER) |
|---|---|---|---|
| LIGHT 450-750 | ⅞" | 1 ⅜" | 1 ⅞" |
| MEDIUM 750-1100 | 1 ⅛" | 1 ¾" | 2 ⅜" |
| HEAVY 1100-1600 | 1 ½" | | |

Figure 17:
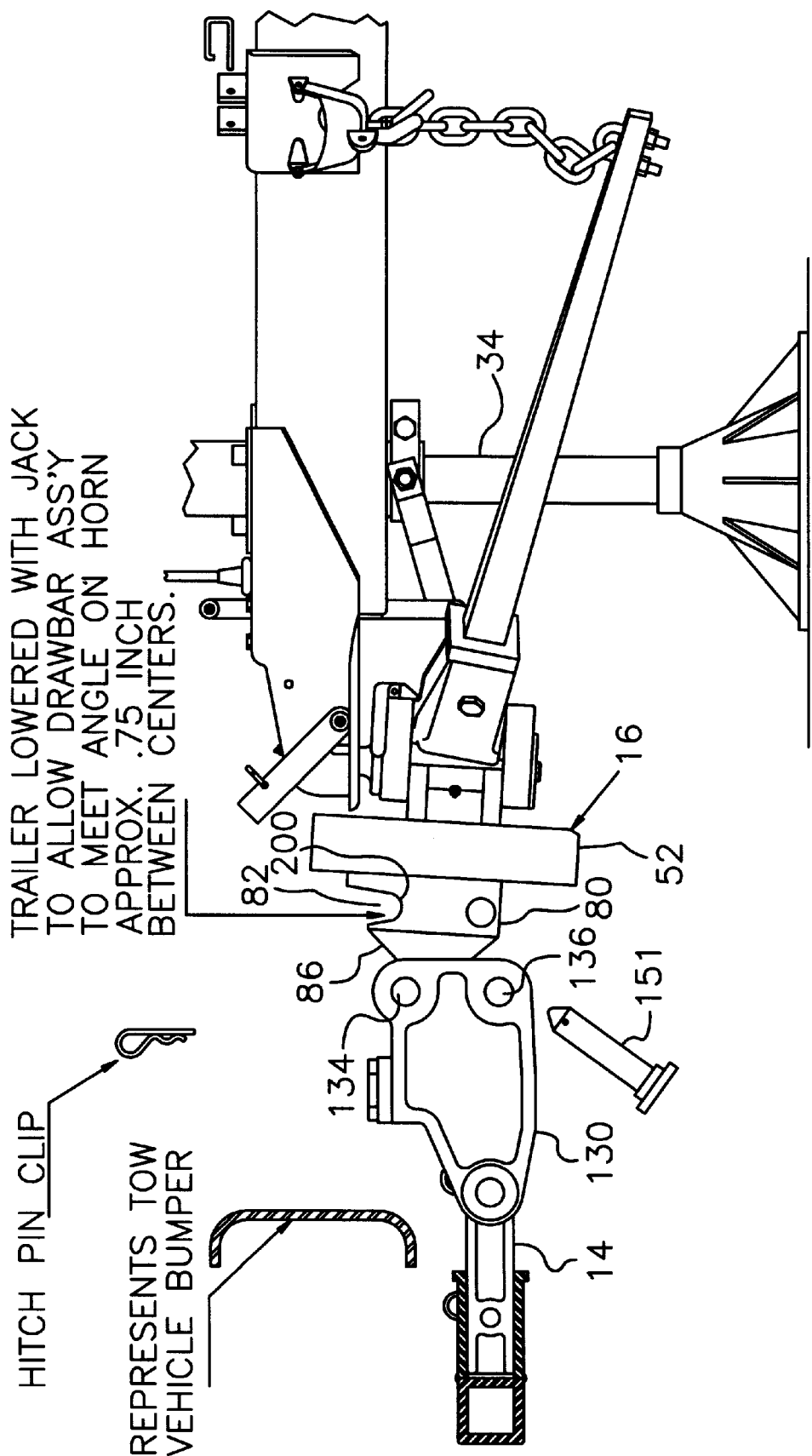
FIG. 17 is a side elevational view of the hitch assembly after the necessary angular and height adjustments have been made and immediately prior to the coupling components being interengaged.
Figure 18:
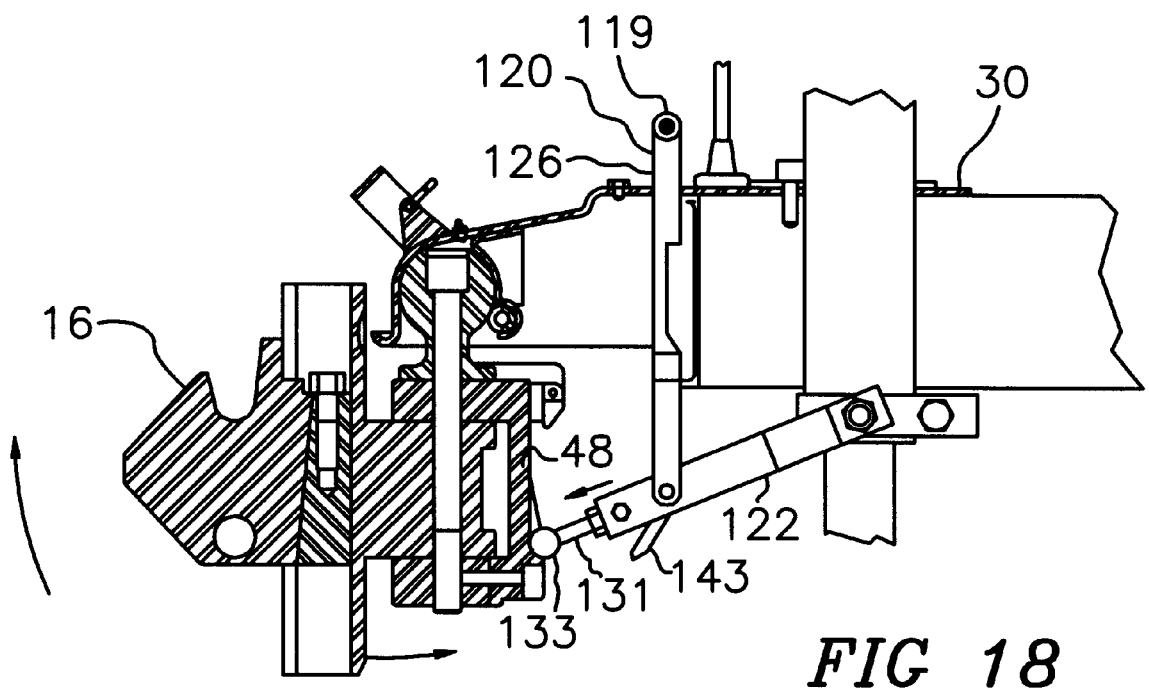
FIG. 18 is a side, partly cross sectional view of the hitch assembly with the hitch head angle adjuster apparatus set to hold the hitch head assembly at a desired angular orientation before the coupling components are interengaged.

The above height dimensions represent the height difference between the axial center of channel recess 82 and the axial center of fixed pin 134. These centers are best illustrated in FIGS. 1 and 17 and the height difference 200 between them is specifically illustrated in FIG. 17. Distance 200 is required to transfer for the eventual torsion that is exerted on the drawbar assembly and, after coupling is completed, helps to return the first coupling component 130 to an angular orientation relative to the ground. This is illustrated more clearly below. Once again, a relatively small distance is required when a large tow vehicle and a light load are involved. Alternatively, a greater spacing 200 is required for relatively flexible passenger type tow vehicles or heavier tongue weights.

Figure 15:
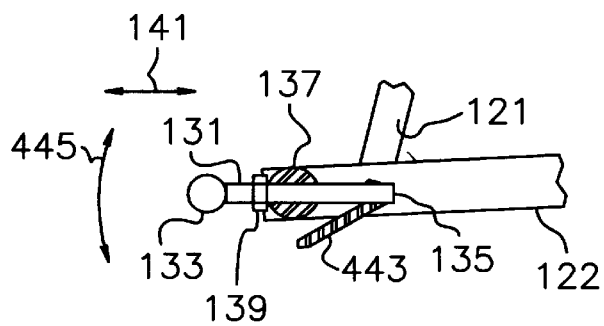
FIG. 15 is an elevational, partly cross sectional view of the adjustable bearing assembly.

After the drawbar assembly angle and the hitch head horn height have been set, the hitch head 16 is angularly adjusted. Bearing element 133, FIG. 15, is adjusted longitudinally outwardly from bracket 122 and engaged with hitch head pocket 48 in the manner illustrated in FIG. 18. Specifically, after bearing mechanism 131 is lengthened, handle 119 is grasped and rotated approximately 10° and spring arm 126 is lowered through trailer frame 30. Element 133 of bearing mechanism 131 is engaged with pocket 48 of hitch head assembly 16. The lever arm 135 of bearing mechanism 131 is pivoted slightly past alignment with bracket 122 until it engages stop 443. As a result, the angular adjustment mechanism 120 is latched in place and hitch head assembly 14 is held at a slightly upward angle, shown in FIGS. 17 and 19. This angle is set so that the line between the axial centers of horn recess 82 and the hitch pin hole 84 is parallel to the line interconnecting the axial centers of pin 134 and hitch pin holes 136.

At this point, the professional installer has typically completed his or her tasks. Alternatively, it should be understood that the above steps can be performed by the trailer owner in many cases. Such steps do not involve welding or other technical procedures normally requiring professional expertise. In any event, all of the preliminary adjustments are completed and the hitch assembly 10 is ready for final coupling and adjustment.

To couple the tow vehicle and trailer, the owner drives the tow vehicle rearwardly toward the waiting trailer. A telescoping rod 500 is mounted on ball coupler 36 to guide the driver in positioning the tow vehicle. Jack 34 lowers the height of the pin 134 so that component 130 engages horn 80 at a point along ramp 86 with the axial centers of pin 134 and recess 82 approximately 0.75 inches apart. The tow vehicle is driven slowly in a rearward direction such that pin 134 rides up ramp 86 and drops into recess 82. At the same time, due to the aforementioned adjustments, the hitch pin holes 136 of component 130 are aligned or almost aligned with hitch pin hole 84 of horn 80. If the holes are slightly misaligned, jack 34 may raise or lower the trailer, as needed, to bring the holes into alignment. Hitch pin 151 is then inserted through the aligned holes. As a result, drawbar assembly 14 is securely interconnected to hitch head 16 and thereby trailer 12 in the manner best depicted in FIGS. 19 and 20. A hitch pin clip 204 is engaged through an opening in the distal end of hitch pin 151 to prevent unintended removal of the hitch pin from the aligned hitch pin holes.

Figure 22:
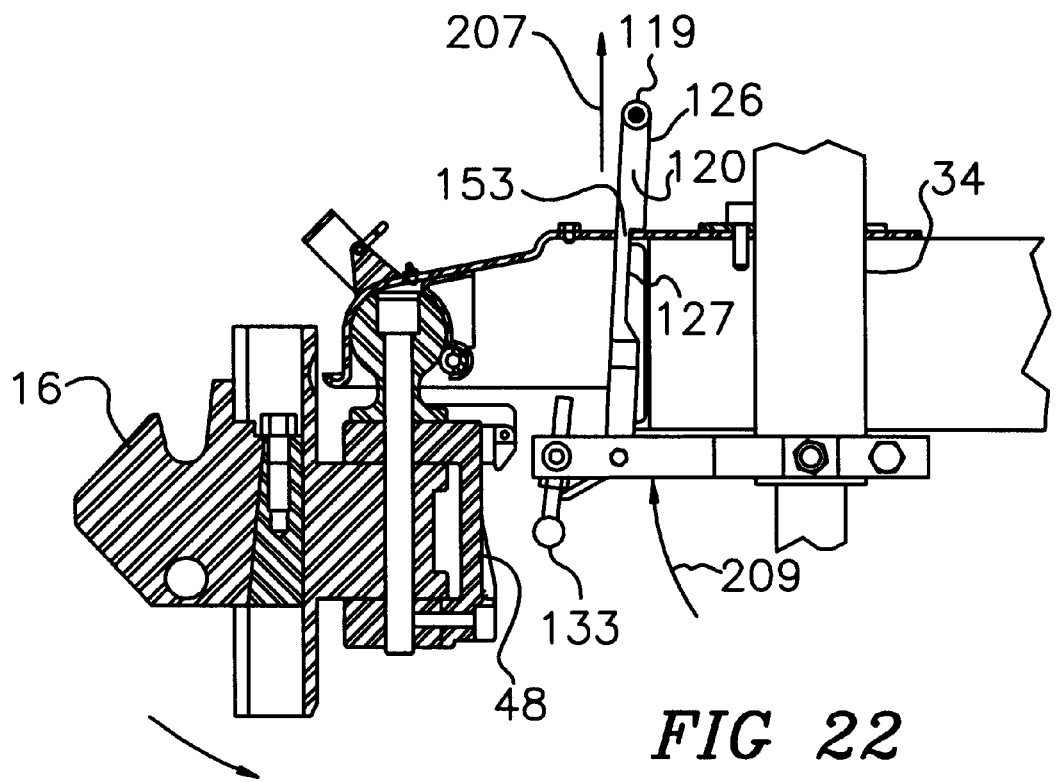
FIG. 22 is an elevational, partly cross sectional view of the hitch assembly with the hitch head angle adjuster apparatus being raised such that the bearing assembly disengages the hitch head assembly.
Figure 19:
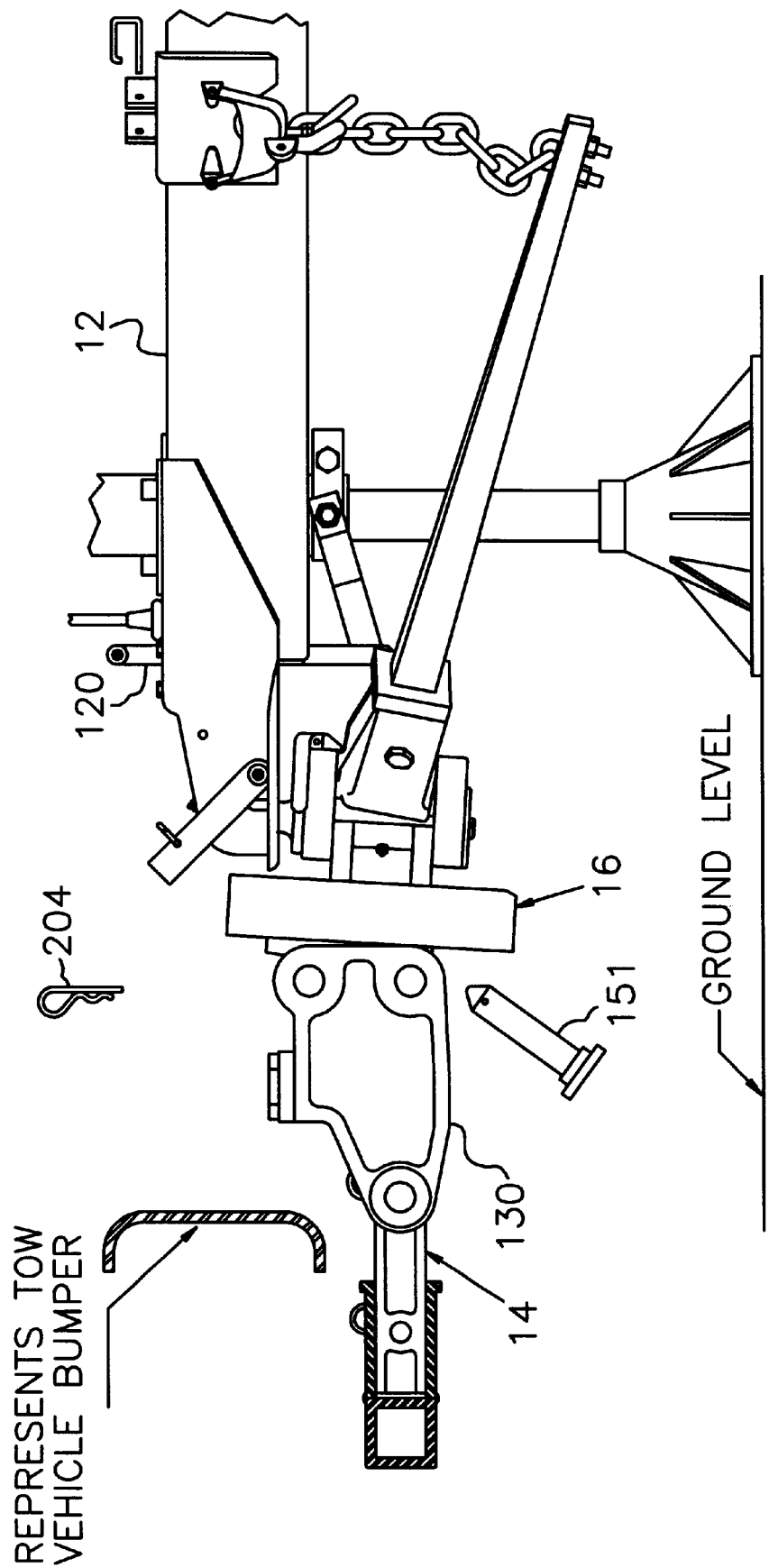
FIG. 19 is a side, elevational view of the hitch assembly after the coupling components have been interengaged and prior to the insertion of the hitch pin and disengagement of the hitch head angle adjuster apparatus.
Figure 20:
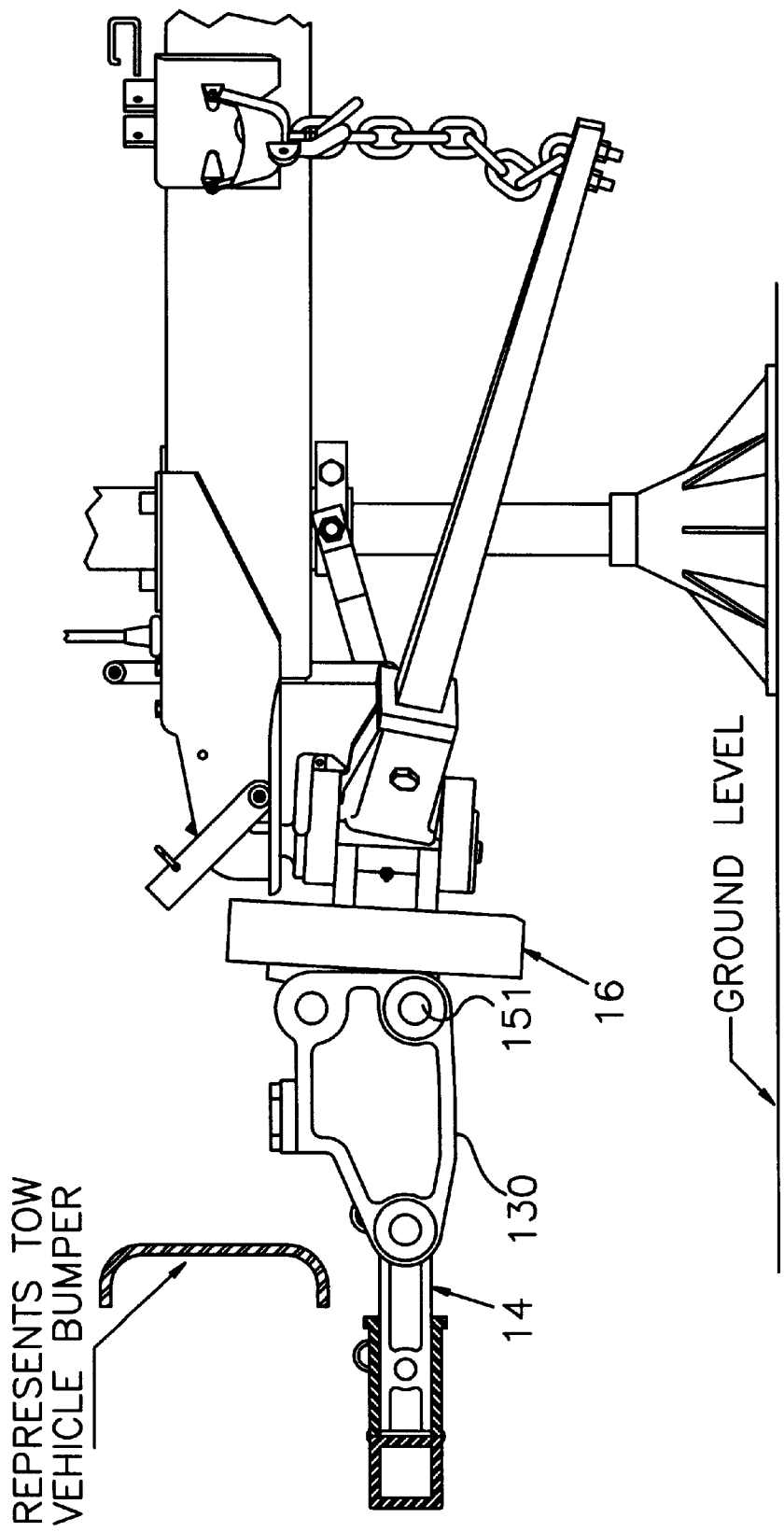
FIG. 20 is a view similar to that of FIG. 19 but after the hitch pin has been interengaged.
Figure 21:
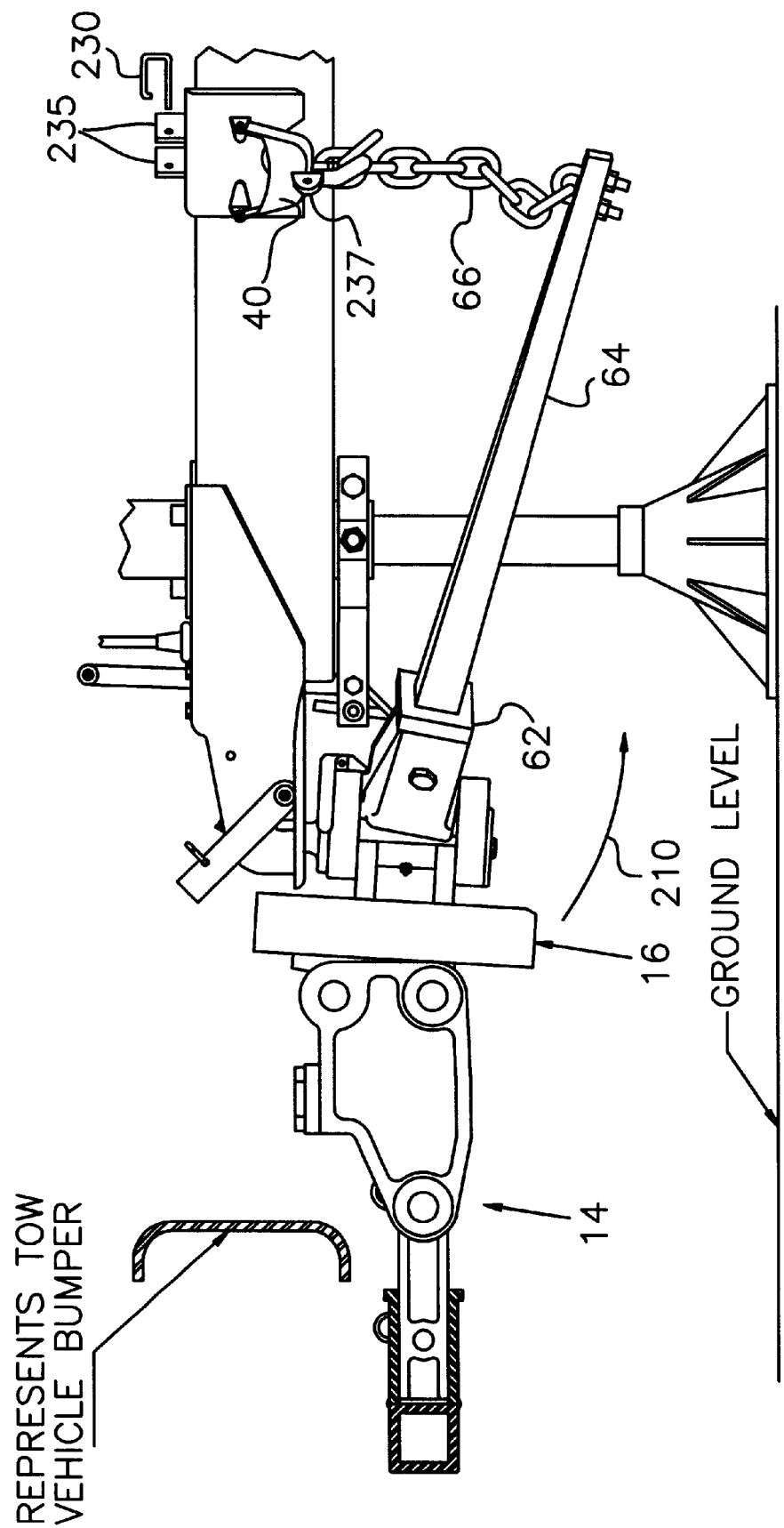
FIG. 21 is a side, elevational view of the hitch assembly after the hitch head angle adjuster apparatus is disengaged from the hitch head.
Figure 23:
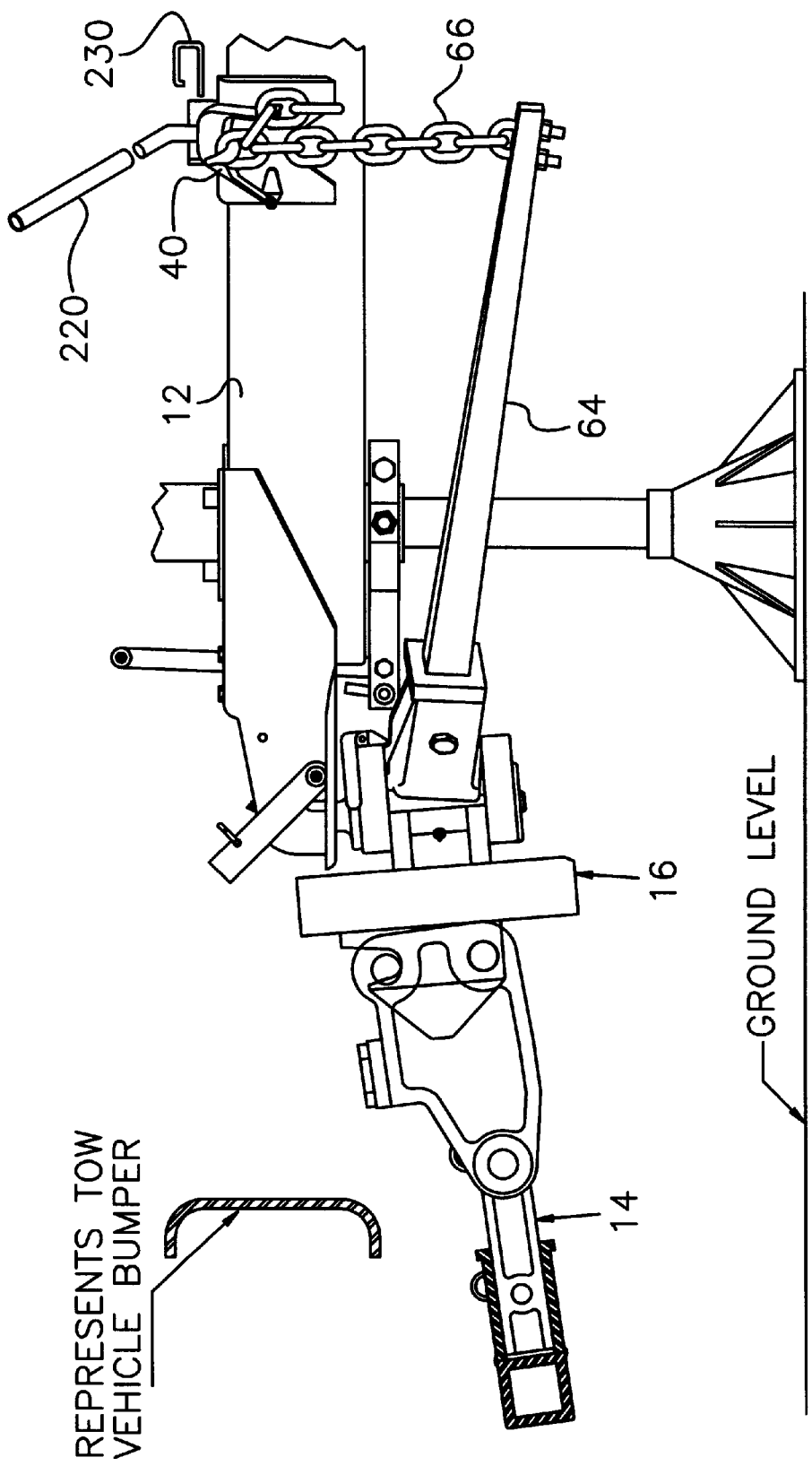
FIG. 23 is a side, elevational view of the hitch apparatus with one of the spring bars being loaded.
Figure 24:
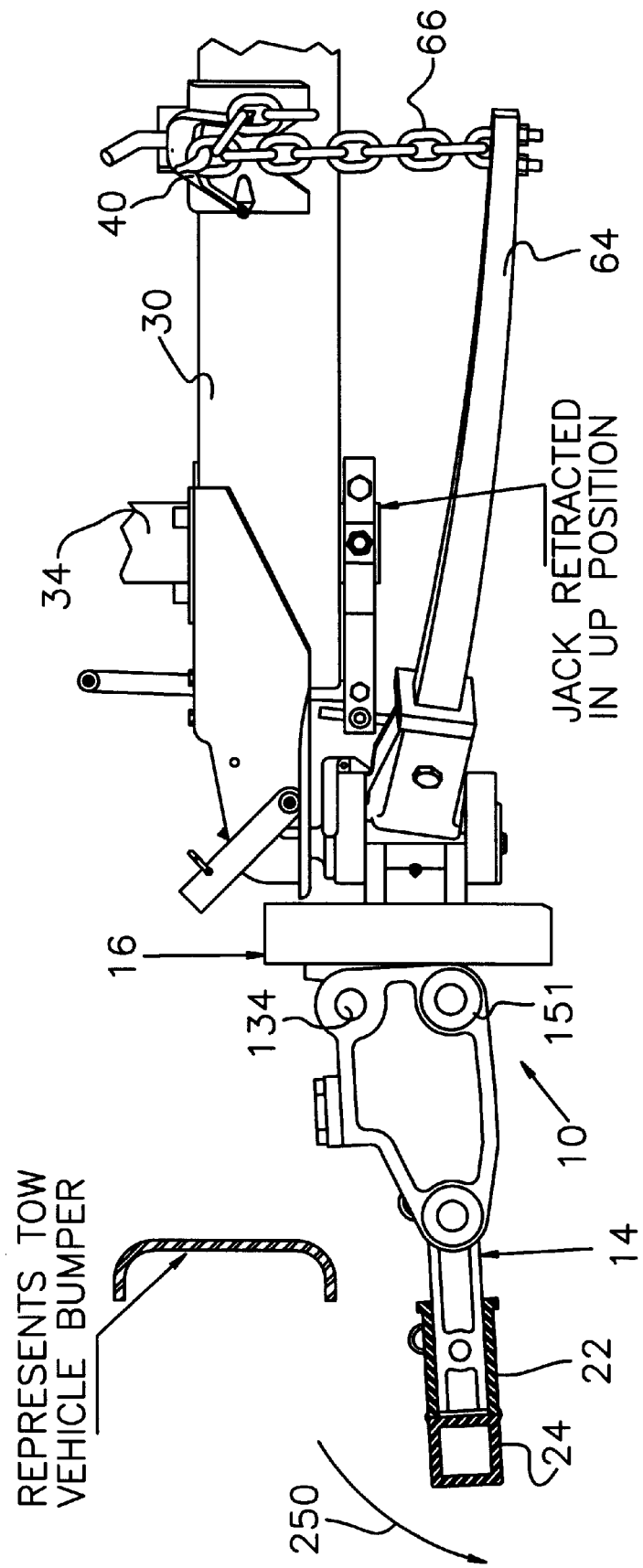
FIG. 24 is a side, elevational view of the hitch assembly after all necessary adjustments have been made and in a fully loaded condition that properly distributes the tongue weight to the axles of the tow vehicle and trailer.

After coupling has been completed, angular adjustment mechanism 120 is released. This is accomplished by simply pulling upwardly on handle 119 in the direction of arrow 207. The lever arm 135 of bearing mechanism 131 pivots away from stop 443 and bracket 122 rotates upwardly relative to the mounting clamp 125 in the direction of arrow 209. As shown in FIGS. 21 and 22, bearing element 133 pivots downwardly and disengages pocket 48 of hitch head 16. As a result, the hitch head assembly pivots downwardly in the manner indicated by arrow 210. In some cases, before angular adjustment mechanism 120 is disengaged from hitch head assembly 16, jack 34 may have to be operated to lower the trailer slightly in order to relieve latching tension of bracket 122 and lever arm 135 on the bearing element 133. This allows handle 119 to be pulled upwardly. When notch 127 reaches opening keyway 153, the spring arm 126 snaps back into its normally biased condition. See FIG. 16. This holds the angular adjustment mechanism 120 in its raised condition.

The trailer owner next loads spring bars 64 in a conventional manner. Specifically, a desired number of links of chain 66 are dropped from toggle 40. In the embodiment that is disclosed, three links drop from the toggle. The trailer owner then pivots toggle 40 upwardly with the assistance of a lever 220 shown in FIG. 23. Typically, jack 34 is used to raise trailer frame 30 so that the loading procedure may be performed fairly easily. A spring bar chain keeper pin 230 engages a pair of holes in ears 235, FIG. 1, carried by the trailer frame 30 and a corresponding hole formed in ear 237 carried by toggle 40. This holds the toggle 40 in the raised condition illustrated in FIG. 24 and properly loads spring bar 64 in the manner illustrated therein.

Each of the two spring bars 64 is loaded in the above-described manner. As a result, torsion is applied through the drawbar assembly 14 and receiver tube 22 to transverse bar 24 in the manner illustrated by arrow 250, FIG. 24. The jack 34 is retracted within the trailer frame 30 in a known manner and the interconnected tow vehicle and trailer are ready for operation. Hitch 10 distributes the trailer tongue weight properly to the front and rear axles of the tow vehicle and to the forward and rearward axles of the trailer. A level, stable and extremely safe ride are provided.

To subsequently disengage hitch apparatus 10, the jack is deployed to engage ground G. The jack is utilized to raise the trailer such that the springs may be easily unloaded. Lower hitch pin 151 is then disengaged from the coupled drawbar assembly and horn. Jack 34 lowers trailer frame 30 to disengage upper pin 134 from horn recess 82. The tow vehicle is pulled slightly forward and receiver pin 26 is disengaged so that drawbar assembly 14 can be removed from receiver tube 22. The drawbar assembly can then be conveniently transported and stored as required.

Following disassembly, the hitch head assembly and hitch head height adjuster remain suspended from the coupler canopy in an unloaded condition. It is unnecessary to disassemble, transport and store the entire hitch head. This is a significant advantage of this invention. The present invention eliminates the time, exertion and aggravation typically associated with disassembling or reassembling the entire hitch head each time the trailer is coupled to the tow vehicle. This makes coupling a quick and simple procedure for almost all trailer owners. The initial angular and height adjustments may be performed by a trailer hitch expert. Alternatively, mechanically inclined trailer owners can also perform such adjustments relatively quickly and simply.

Drawbar assembly 14 and hitch head assembly 16 are composed of durable metals and metal alloys similar to those which are conventionally used in the trailer hitch industry. Various known manufacturing techniques may be employed to construct these components. The only component which must be removed and installed each time the hitch is assembled is the drawbar assembly. This assembly can be fairly lightweight (e.g. less than 10 lbs.) and is easy for most persons to carry and install.

Accordingly, the hitch employing the adjustable coupler of this invention is not only easy to install and remove, it is also fully adjustable. It eliminates the need for a permanent weld between the tongue and the hitch head. It also eliminates the need to break and reform that weld when a different tow vehicle is required or an erroneous connection is initially made. The hitch head may be readily interchanged between various tow vehicles and trailers and it may be adjusted or readjusted, as required, in a quick and convenient manner. The adjustable coupler disclosed herein may be used on virtually all hitches normally employing a drawbar that is engaged with a tow vehicle and a hitch head that is suspended by a ball from the trailer.

It will thus be seen that the objects made apparent from the preceding description are sufficiently obtained and certain changes may be made in the above construction without departing from the scope of the invention. It is intended that all matter contained in the above description and shown in the accompanying drawings be interpreted as illustrative and not in an imitative sense. Although specific features of the invention are shown in some drawings and not others, this is for convenience only as each feature may be combined with any or all of the features in accordance with the invention. Other embodiments, within the scope of this invention, will occur to those skilled in the art.

What is claimed is:

1. An adjustable weight distributing trailer hitch for interconnecting a trailer to a tow vehicle, said hitch comprising;

a drawbar assembly including a bar that is selectively attachable to the tow vehicle and a first, angularly adjustable coupling component that is pivotally interconnected to said bar, said first coupling component including means for adjusting the angle between said bar and said first coupling component;

a hitch head assembly including a ball element that is releasably attachable to and suspendable from a ball coupler supported by the trailer, a second coupling component, and means pivotally connected to said ball element along a generally vertical axis for adjusting the height of said second coupling component, said second coupling component including means for interengaging complementary means in said first coupling component to couple said first and second coupling components; and means mountable to the trailer for angularly adjusting the second coupling component;

whereby the angle of said first coupling component relative to said bar and the height of said second coupling component relative to the ground are adjusted according to predetermined parameters, said second component is angularly adjusted and said first and second coupling components interengaged and coupled to attach said trailer to said tow vehicle.

2. The apparatus of claim 1 in which said second coupling component includes a horn having means defining an upper recess and means defining a lower hitch pin hole, said first coupling component including a fixed upper pin that engages said recess and means defining a lower hitch pin hole that is alignable with said hitch pin hole in said second coupling component, said fixed pin being engaged with said recess and said lower hitch pin holes of said first and second coupling components being aligned to receive an elongate hitch pin such that said first and second components are coupled.

3. The apparatus of claim 2 in which said horn includes a ramp that is interengaged by said fixed pin of said first coupling component such that as said tongue assembly is directed rearwardly, said fixed pin of said first coupling component interengages and travels along said ramp and is introduced into said recess.

4. The apparatus of claim 1 in which said means for adjusting the height of said second coupling component includes a generally vertical channel that slidably receives said first coupling component and means for locking said second coupling component at a selected position in said channel such that said second coupling component is held at a selected height above the ground.

5. The apparatus of claim 4 in which said means for locking include a tapered component that is matably interengagable with a corresponding taper carried by said second coupling component, said tapered component being received by said channel and interengaged with said mating taper of said second coupling component to urge said second coupling component into locking interengagement with said channel.

6. The apparatus of claim 5 further including means for interconnecting said tapered component and said second coupling component.

7. The apparatus of claim 1 in which said means for adjusting the angle between the bar and the first coupling component include a threaded component carried by one of said first coupling component and said bar and a nut that is interengaged with the threaded component and carried by the other of said first coupling component and said bar.

8. The apparatus of claim 1 in which said means for angularly adjusting the second coupling component includes an adjustable bearing assembly that is pivotally connected to the trailer, said bearing assembly including a bearing element that is adjustable between a plurality of selected positions and means for selectively interengaging said bearing assembly with said hitch head assembly, with said bearing element in a selected position, to temporarily hold the second coupling component at a desired angle.

9. The apparatus of claim 8 in which said means for selectively interengaging include a tortionally resilient spring arm pivotally interconnected to an elongate arm of said bearing assembly and extending upwardly therefrom, and further including a handle located at the upper end of said tortionally resilient arm, said handle being grasped to pivotally raise and lower said bearing assembly such that said bearing element is respectively disengaged from and engaged with said hitch head assembly.

10. The apparatus of claim 9 further including stop means for retaining said bearing assembly in a condition that supports said second coupling component at a predetermined angle.

11. The apparatus of claim 9 further including latch means for holding said tortionally resilient bar in the raised position.

12. The apparatus of claim 1 in which said hitch head assembly further includes means attached to said ball element for supporting a pair of spring bar loading elements that extend rearwardly of said hitch head assembly.

13. The apparatus of claim 12 in which each spring bar loading element includes a trunion portion that is pivotally engaged with said means for supporting.

14. The apparatus of claim 12 in which said means for supporting include a yoke having a pair of receptacles, each spring bar loading element carrying a respective trunion portion that is pivotally received in a respective one of said receptacles.

15. The apparatus of claim 12 further including means for releasably interconnecting a distal rearward end of each loading element to said trailer to load said hitch apparatus.

16. An adjustable weight distributing trailer hitch for interconnecting a trailer to a tow vehicle, said hitch comprising;

a drawbar assembly including a bar that is selectively attachable to the tow vehicle and a first, angularly adjustable coupling component that is pivotally interconnected to said bar, said first coupling component including means for adjusting the angle between said bar and said first coupling component;

a hitch head assembly including a ball element that is releasably attachable to and suspendable from a ball coupler supported by the trailer, a second coupling component, and means pivotally connected to said ball element along a generally vertical axis for adjusting the height of said second coupling component, said second coupling component including means for interengaging complementary means in said first coupling component to couple said first and second coupling components;

means mountable to the trailer for angularly adjusting the second coupling component, whereby the angle of said first coupling component relative to said bar and the height of said second coupling component relative to the ground are adjusted according to predetermined parameters, said second component is angularly adjusted and said first and second coupling components interengaged and coupled to attach said trailer to said tow vehicle;

said hitch head assembly further including means attached to the ball element for supporting a pair of spring bar loading elements that extend rearwardly of the hitch head assembly, each spring bar loading element being pivotally engaged with said means for supporting; and means for releasably interconnecting a distal rearward end of each loading element to said trailer to load said hitch apparatus.

17. In a trailer hitch for interconnecting a trailer and a tow vehicle, a self-locating coupling mechanism comprising:

a forward coupling component that is attachable to a tow vehicle;

a rearward coupling component that is attachable to a trailer to be towed;

said forward coupling component including a single, longitudinally fixed pin that extends transversely to the direction of travel and a lower hitch pin hole; said rearward coupling component including a horn that has a ramp and a recess having an open upper end, said horn further including a second lower hitch pin hole, said recess being formed proximate an upper end of said ramp, said pin and said ramp being supported at relative heights such that directing said tow vehicle toward said trailer causes said pin to interengage said ramp, travel along said ramp and drop into said recess to couple said forward and rearward coupling components and interconnect said trailer and said tow vehicle, said lower hitch pin holes in said forward coupling and said horn being alignable when said forward and rearward coupling components are connected by adjusting the height of said trailer; and an elongate hitch pin that is received by said aligned lower hitch pin holes to couple together said forward and rearward coupling components.

* * * * *